United States Patent [19]

Simon

[11] Patent Number: 4,915,677

[45] Date of Patent: Apr. 10, 1990

[54] FORCE RESOLVING V BELT

[75] Inventor: Jean-Michel Simon, Clamart, France

[73] Assignee: Hutchinson, Paris, France

[21] Appl. No.: 231,478

[22] Filed: Aug. 12, 1988

[30] Foreign Application Priority Data

Aug. 13, 1987 [FR] France ............................... 87 11529

[51] Int. Cl.$^4$ ............................................... F16H 1/22
[52] U.S. Cl. ..................... 474/242; 474/244
[58] Field of Search ............... 474/201, 237, 240, 242, 474/244, 245, 268, 272; 156/137–142

[56] References Cited

U.S. PATENT DOCUMENTS 4,552,550  11/1985  Howerton ........................ 474/244 X
4,648,857  3/1987   David et al. ......................... 474/272
4,773,896  9/1988   Bouteiller et al. .................. 474/242

FOREIGN PATENT DOCUMENTS 1960350  6/1971   Fed. Rep. of Germany .
2452035  10/1980  France .
2030263  4/1980   United Kingdom .

Primary Examiner—Thuy M. Bui
Attorney, Agent, or Firm—Cushman, Darby & Cushman

[57] ABSTRACT

An endless belt comprising a longitudinal reinforcement formed by a tension resistant member or a plurality of such members, such as cables, made more particularly from metal, glass fibers or any other synthetic material having high tensile resistance, transverse elements of a general trapezoidal form having a base and two lateral fins inclined with respect to the base which is made from metal or any other material having good compression resistance, with an elastomer mass which joins said transverse elements solidly together and with the longitudinal reinforcement, wherein the transverse elements are formed such that, during operation, the resultant of the bearing reaction forces of the cheeks of the pulley on said transverse elements is very close to the mean force transmission line of the longitudinal reinforcement which forms substantially the neutral axis of the belt.

14 Claims, 2 Drawing Sheets

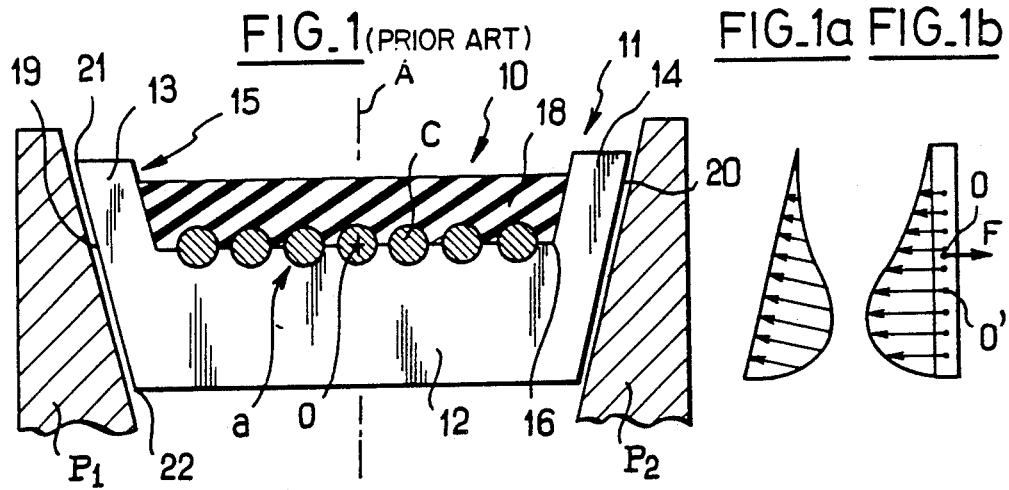
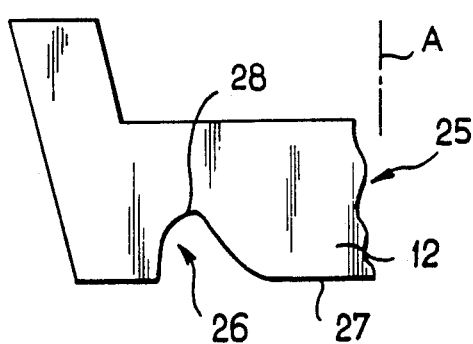
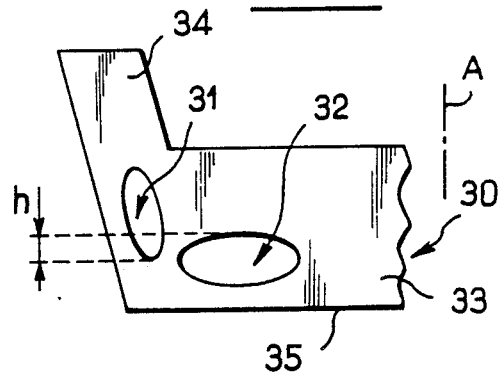
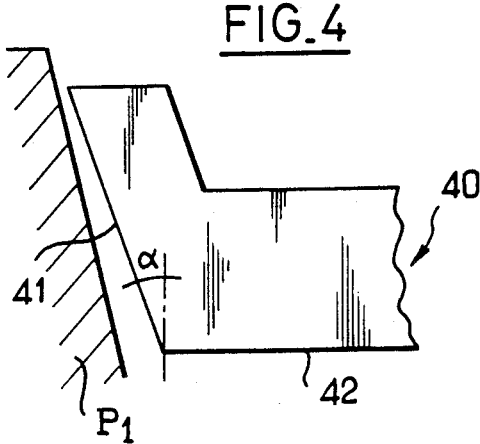
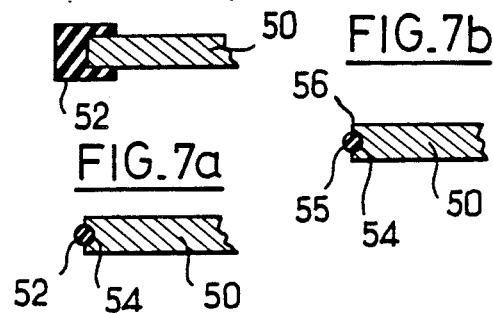

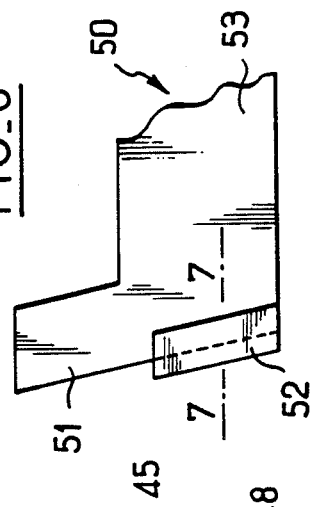
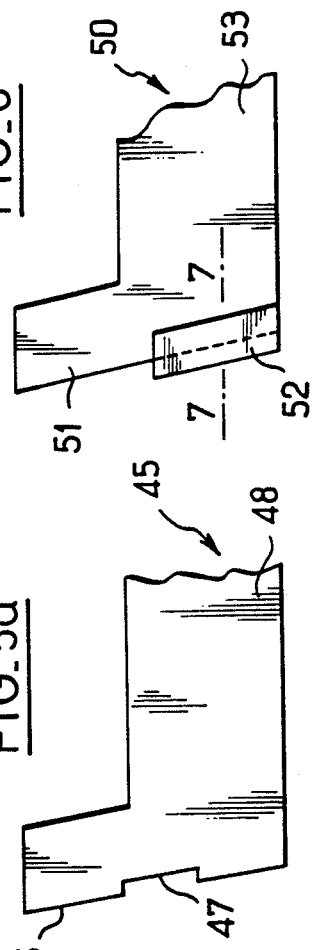
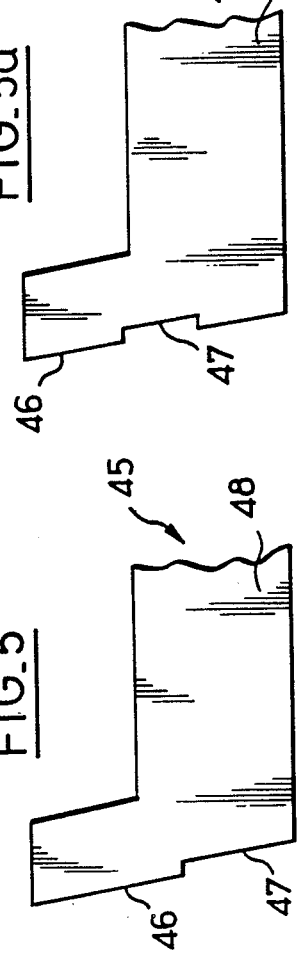
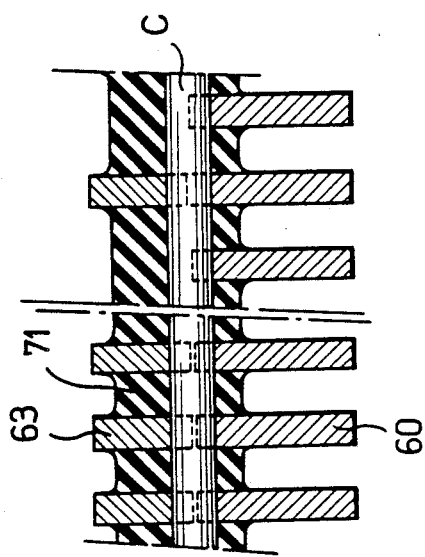
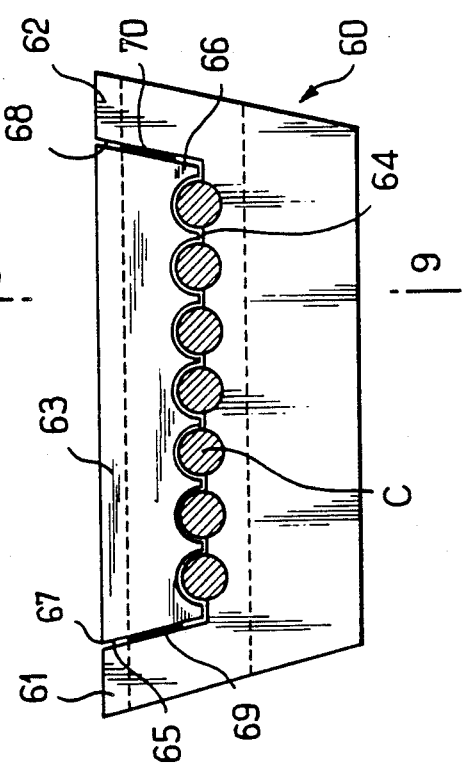

FORCE RESOLVING V BELT

BACKGROUND OF THE INVENTION

1. Field of the Invention

The invention relates to an endless V belt intended more particularly, but not exclusively, for equipping grooved pulley speed variators, or clutch devices for the motor car industry.

The invention relates more particularly to such an endless V belt of the type having a longitudinal reinforcement formed by a tension resistant member or several such members, such as cables, made for example from metal, glass fibers or any synthetic material having high tensile strength and transverse elements made from metal or another material having compression resistance, with an elastomer mass which joins the transverse elements solidly together and with the longitudinal reinforcement.

2. Description of the Prior Art

When such a belt is used as power transmission belt, for example in a speed variator it is subjected to high lateral compression forces exerted by the cheeks of the pulleys with which it cooperates and, in a belt of this type such as divulged by FR-A-2 452 035, i.e. in which the transverse elements are plates with a solid base and lateral fins, the curve representative of the bearing reactions of the cheeks of the pulleys on the plate is highly asymmetric. Such asymmetry of the bearing reactions, due to different stiffnesses of the base and of the fins of the plate results in lateral friction forces on the sides of the plates, proportional to the bearing reaction forces and, consequently, the driving forces of the belt which result from the friction forces also have an asymmetric distribution with respect to the reinforcement formed by a bundle of cables. With the barycenter thus removed from the center of application of the tractive force of said cables, in a direction perpendicular to that of the tractive force, a parasite moment tends to tip the plates over and introduce an effect harmful to the correct operation of the belt. The lifespan of this latter is then very considerably less than that which might be expected in most of the mechanisms which it equips, particularly speed variators.

The purpose of the invention is consequently to provide an improved V belt of the above mentioned type whose lifespan is considerably greater than that of the best known belts recommended in the prior art.

SUMMARY OF THE INVENTION

This aim is reached by providing an endless belt comprising a longitudinal reinforcement formed by a tension resistant member or a plurality of such members, such as cables: made more particularly from metal, glass fibers or any other synthetic material having high tensile strength. The endless belt includes transverse elements of a general trapezoidal form having a base and two lateral fins inclined with respect to the base which is made from metal or any other material having good compression resistance. An elastomer mass joins said transverse element solidly together and with the longitudinal reinforcement. Wherein the transverse elements are formed or are provided with means such that, during operation, the resultant of the bearing reaction forces of the cheeks of the pulley on said transverse elements is very close to the mean force transmission line of the longitudinal reinforcement which forms substantially the neutral axis of the belt.

The moment tipping the plates or the transverse elements over, which can be observed in prior art belts, is thus considerably reduced, even cancelled out, with consequently a very high increase in the lifespan of the belt.

In a first series of embodiments of the present invention, the base of each transverse element or plate of the belt is made more readily deformable by appropriately forming said plates.

In a second series of embodiments, means are fixed to each plate for better distributing the compression forces and, as the case may be, locally reducing the friction forces, such for example by means of a flexible material lining.

In a third series of embodiments, the tendency to flexion of the fins of each plate is offset by spacer means disposed between said fins.

Whereas belts in accordance with the first and third series of embodiments are particularly well adapted for use in speed variator mechanisms, a belt in accordance with the second series of embodiments may further advantageously find an application in clutch devices where slipping is required, i.e. a certain sliding against each other without producing driving between the lateral sides of the belt and the cheeks of the pulleys.

BRIEF DESCRIPTION OF THE DRAWINGS

Other features and advantages of the invention will be clear from the following description given by way of example with reference to the accompanying drawings in which:

FIG. 1 is a cross sectional view of a known V belt, the section being made through a transverse element;

FIGS. 1a and 1b are diagrams;

FIGS. 2 to 5a shows schematically transverse elements or plates of the belt of the invention for different forms of a first series of embodiments;

FIG. 6 is a view similar to FIGS. 2 to 5 but for another embodiment;

FIG. 7 is a sectional view through line 7—7 of FIG. 6;

FIGS. 7a and 7b are views similar to that of FIG. 7 but for variants;

FIG. 8 is a view similar to that of FIG. 1 but for a belt of the invention and a third series of embodiments;

FIG. 9 is a partial sectional view through line 9—9 of FIG. 8.

DESCRIPTION OF THE PREFERRED EMBODIMENTS

Referring first of all to FIGS. 1, 1a and 1b which illustrate a V belt intended more particularly for equipping speed variators with grooved pulleys for transmitting the movement by contact and pressure in the groove of said pulleys. Belt 10 is formed of a plurality of transverse elements or plates 11, of a general trapezoidal shape, preferably made from high hardness steel, a rigid synthetic material or from any other material having good compression resistance and which are, as can be seen in FIG. 1, formed with a base 12 and fins 13 and 14 slanted with respect to the axis of symmetry A through an angle of about 11°. Between fins 13 and 14, on the one hand, and base 12 on the other is provided a housing 15 whose bottom 16 receives a plurality of cables C, preferably made from steel but which may also be made from glass fibers or synthetic fibers having great wear resistance and the assembly of which forms the longitudinal reinforcement a of the V belt. The bundle of cables C, merging substantially with the neutral axis of the belt, transmits the tensile forces which may be considered, from the mechanical point of view, as applied to the center 0 forming the intersection of the axis A of a plate and the cable bundle. The transverse elements of plates 11 are secured together and to the longitudinal reinforcement a by an elastomer mass 18 which partially fills housing 15 and the spaces separating the consecutive transverse elements in the longitudinal direction of the belt (FIG. 9). In its condition of use, belt 10 cooperates with the cheeks P1 and P2 of a grooved pulley, which exert lateral compression forces which generate, on the sides 19 and 20 of the plates, bearing reactions of unequal values between the external end 21 and the internal end 22 of sides 19, 20, because of the greater possibility of deformation of fins 13 and 14 with respect to the body or base 12 of the plate, the bearing reactions of a cheek on a plate being as shown in FIG. 1a, i.e. with an asymmetric distribution, relatively small with respect to the fins and higher with respect to the body. Since the driving forces of the belt depend on the lateral friction forces on sides 19 and 20 of the plates and since these latter are themselves proportional to the bearing reaction forces, it follows that the drive forces also have an asymmetric distribution, as shown in FIG. 1b, which illustrates in a profile view the distribution of friction forces f on a plate and the resultant F of the tractive force of the cable applied to point 0. With the resultant of the friction forces applied to point 0', distant from point 0, the plates are subjected to an overturning moment which tends to move them with consequently a reduction in the lifespan of the belt.

To overcome this drawback, the invention proposes forming the belt from plates which in a first series of embodiments are formed so as to cancel out or substantially cancel out the distance 0—0', i.e. to draw together, in an attempt to merge them, the neutral axis of the friction forces and the neutral axis of the belt, merging substantially with that of the cable bundle.

In a first embodiment shown in FIG. 2, the body 12 of each plate is stamped symmetrically on each side of axis A to form a notch 26 open on the inner edge 27 of the plate and directed somewhat in the direction of fins 13, 14, with a rounded apex 28. Such a notch, which interrupts the continuity of the metal fibers in the longitudinal direction of edge 27 and which makes the base of the plate more readily deformable under the effect of the lateral compression forces exerted by the cheeks of the pulleys, overcomes a part of the drawbacks of known belts and, in particular, improves the lifespan by a considerable factor.

In a second embodiment (FIG. 3) each plate 30 is pierced with buttonholes 31 and 32, the first of which extends mainly in the connection zone of body 33 of plate 30 and a fin 34, and is directed in the direction of said fin, whereas the second is situated in the longitudinal direction of the inner edge 35 of the plate, in body 33, and so that the apparent contours of the two buttonholes overlap somewhat, in projection, along the direction of axis A, as shown at h.

In this embodiment also, and as mentioned above with reference to FIG. 2, the structure of plate 30 is symmetrical with respect to axis A, i.e. plate 30 in fact comprises four symmetric buttonholes disposed in twos with respect to said axis. In the embodiment shown in FIG. 4, the sides 41 of each plate 40 are inclined with respect to the inner edge 42 through an angle α which is slightly greater than the angle of cheeks P1 and P2 of the pulleys. Thus, if the angle of the cheeks is 11°, the angle α has a value of about 11.2°–11.3°.

In the embodiment shown in FIG. 5, it is also symmetrical with respect to axis A, the side 46 of each plate 43 is stamped to form a rebate 47 which extends over approximately the greatest part of the height of body 48 of the plate.

In a variant, rebate 47 is formed at the foot of the plate or else at the level of the cable bundle (FIG. 5a).

In a second series of embodiments, means are fixed to each plate for better distributing the compression forces and, as the case may be, locally reducing the friction forces.

In a first embodiment, FIGS. 6 and 7, the two sides 51 of a plate 50 are provided with a flexible material lining 52. This lining may extend over the whole of sides 51 or, in a variant, over only a part of said sides, advantageously opposite the body 53 of the plate. Lining 52 may be fixed to the sides of the plate 53 by straddling, in the case of the U cross section (FIG. 7), or may be housed in a recess 54 in the side (FIG. 7a). The lining may also be made from a flexible material in a single piece or, in a variant shown in FIG. 7b, formed by a cord 55 reinforced with a wire of resistant material 56 such a steel, the whole being housed in the recess 54 in the side of plate 50 (FIG. 7b).

The invention envisages, within its scope, combining some of the above described embodiments with each other and it also contemplates, in a third series of embodiments shown in FIGS. 8 and 9 offsetting the tendency to flexion of fins 61 and 62 of plate 60 by disposing a spacer 63 therebetween. This spacer is advantageously formed from the same material as that forming the plate and, having a generally trapezoidal shape, is stamped on its inner edge 64 so as to correspond with the cables C which it straddles. Spacer 63 may be fixed to plate 60 by welding along sides 65 and 66 of the spacer and the internal edges 67 and 68, respectively, of the fins 61 and 62 shown at 69 and 70. The weld may be formed by capacitor discharge or any other appropriate means.

In such an embodiment, spacers such as 63 may further provide mechanical jamming of cables C, either principally or complimentarily to known stop means.

Although the invention associates a spacer such as 3 with each plate 60, as shown in the left-hand part of FIG. 9, in a variant such a spacer may be associated with only some of the plates of the belt, as shown in the right-hand part of FIG. 9 which also illustrates the distribution of the elastomer mass 71 joining the transverse elements or plates of the bet solidly together and to the reinforcement.

Good results have been obtained, particularly in so far as the lifespan is concerned, by mean of steel plates having a total height between 12 and 16 mm, a length of about 24 mm, a width of the body of about 8 mm and with a steel cable reinforcement of 1 to 1.2 mm in thickness.

What is claimed is:

1. An endless belt for use with a pulley having inclined interior walls comprising a longitudinal reinforcement formed by at least one tension resistant member having a high tensile strength, a plurality of spaced apart transverse elements having a generally trapezoidal form, each such transverse element including a base having an inner edge and two lateral fins inclined with respect to the base, each fin having a side for engaging the pulley, an elastomer provided between at least a portion of said transverse elements and longitudinal reinforcement to join together such elements and said at least one tension resistant member, said transverse elements are including means for rendering the transverse element deformable under lateral compression force, said deformable means being positioned symmetrically on said transverse element with respect to a longitudinal plane thereof and adjacent said fins and said inner edge so that, during operation, the resultant of bearing reaction forces of the interior wall of the pulley acting on said transverse elements is very close to a mean force transmission line of the longitudinal reinforcement which forms substantially a neutral axis of the belt.

2. The belt as claimed in claim 1, wherein the base of each transverse element is shaped so as to approximate its deformability to that of the fins.

3. The belt as claimed in claim 1, wherein the base of each transverse element includes means defining a notch open on its inner edge.

4. The belt as claimed in claim 2, wherein each side of said transverse elements includes means defining a through hole with an elongated shape directed substantially in the direction of said fin and a second elongated through hole directed substantially parallel to said inner edge, said through holes on each side having contours which overlap in projection in the direction of the axis of the transverse elements.

5. The belt as claimed in claim 2, wherein the angle of the lateral sides of the inner edge of each transverse element is slightly greater than the slant angle of the interior walls of the pulleys.

6. The belt as claimed in claim 2, wherein the sides of each transverse element have means defining a rebate which extends over a portion of the height of said sides.

7. The belt as claimed in claim 6, wherein said rebate means extends upwardly from said inner edge.

8. The belt as claimed in claim 6, wherein said rebate means is positioned on each side at the level of the cable bundle.

9. The belt as claimed in claim 1, wherein each transverse element is provided on its sides with a flexible material for better distributing compression forces during operation and for reducing the friction forces.

10. The belt as claimed in claim 9, wherein said flexible material has a U-shaped cross-section that straddles the sides of said transverse element.

11. The belt as claimed in claim 9, wherein the sides include means defining a recess and said flexible material is housed in said recess.

12. The belt as claimed in claim 11, wherein the flexible material is shaped as a rod and includes a reinforcement material.

13. The belt as claimed in claim 1, wherein at least some of said transverse elements are provided with spacer means disposed between the fins and fixed thereto for strengthening the fins.

14. The belt as claimed in claim 13, wherein the spacer means are formed and positioned so that they provide complementary mechanical immobilization.

* * * * *